United States Patent Office 3,719,688
Patented Mar. 6, 1973

3,719,688
PROCESS FOR THE PRODUCTION OF 2,2-DIHYDROCARBYL - 2,3 - DIHYDRO-BENZO - 1,3-OXAZONES-4
Peter Teichert, Germering, and Hans-Ludwig Vogel, Unterpfaffenhofen, Germany, assignors to Chemische Fabrik Aubing Dr. Kurt Bloch Nachf., Munich, Germany
No Drawing. Filed July 13, 1970, Ser. No. 54,587
Claims priority, application Germany, July 14, 1969, P 19 35 754.1
Int. Cl. C07d 87/08
U.S. Cl. 260—244 R       6 Claims

ABSTRACT OF THE DISCLOSURE

Salicylamide is reacted with a ketone, using excess ketone as solvent. The reaction is carried out by means of a carboxylic acid anhydride in the presence of a substance of the class consisting of proton donors and Lewis acids at temperatures up to 70° C.

---

The conversion of salicylamide with ketones to 2,2-dihydrocarbyl-2,3-dihydro-benzo-1,3-oxazones-4 has been known for a long time (Bruce W. Horrom and Harold E. Zaugg, J. Am. Chem. Soc. 72, 721–724) (1950). In accordance with the process heretofore known, the yields obtained by the use of acyclic ketones are uniformly poor. Also, the purity of the product leaves much to be desired. For these reasons, the method of preparation heretofore known must be considered to be only a laboratory method; it is not suitable for use in the manufacture of 2,2 - dihydrocarbyl-2,3-dihydro-benzo-1,3-oxazones-4, because the reaction product produced thereby contains up to 50% of salicylamide.

The object of the invention is to provide a method for the manufacture of 2,2-dihydrocarbyl-2,3-dihydro-benzo-1,3-oxazones-4 which produces them in high yields and in great purity.

This object is essentially achieved by carrying out the reaction by means of carboxylic acid anhydrides, preferably acetic anhydride, in the presence of proton donors and/or Lewis acids, at temperatures up to about 70° C.

The subject of the invention is thus a process for the production of 2,2-dihydrocarbyl-2,3-dihydro-benzo-1,3-oxazones-4 by conversion of salicylamide with ketones, wherein excess ketone serves as the solvent; the process is characterized in that the reaction is carried out in the presence of proton donors and/or Lewis acids and in the presence of acetic anhydride at temperatures up to about 70° C.

As ketones there may be used any desired ketones of the open-chain type, for example aromatic and aliphatic ketones; preferred ketones are acetophenone, benzophenone, methyl ethylketone and diethylketone. In the process according to the invention, acetone is particularly preferred as the ketone.

Preferably the process of the invention is carried out in the presence of mineral acids, particularly sulfuric acid.

In a preferred embodiment of the invention, the reaction is carried out at a salicylamide concentration of 5 to 30 weight percent, computed upon the entire reaction mixture.

The quantity of acetic anhydride used may be varied within wide limits, but preferably is equal to or slightly more than the molecular equivalent of the quantity of salicylamide.

The process of the invention preferably is carried out at a temperature of about 40 to 60° C.

In comparison with the process heretofore known, the process according to the invention has the advantage that the reaction product is obtained in higher yield and better purity. Thus in the conversion of salicylamide with acetone, 2,2-dimethyl-2,3-dihydro-benzo-1,3-oxazone-4 is obtained in a yield of 83 to 92% of theoretical and with a melting point of 136 to 138° C. In comparison, the yield in the previously known process amounted to 47–50%, and the product had a melting point of only 135 to 137° C. and thus was produced in lower purity. While the previous process required a reaction time of many hours, the process of the present invention can be carried out even on a large scale in less than 1 to 2 hours.

The compounds which can be produced in accordance with the invention can be used as medicines, particularly as analgesics. They have the following structural formula:

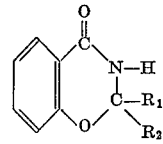

in which $R_1$ and $R_2$ are the same or different, and each of $R_1$ and $R_2$ is an alkyl radical such as methyl or ethyl.

The following examples illustrate the invention.

EXAMPLE 1

A 1 liter 3 neck flask provided with a stirrer, thermometer and reflux condenser is charged with 300 ml. of acetone, and 30 ml. of concentrated sulfuric acid is added dropwise with stirring and cooling. The cooling is so controlled that an end temperature of 30° C. is attained. Next salicylamide (137 grams) is introduced. Without further cooling acetic anhydride (110 ml.) is then added dropwise at a slow rate, whereupon the precaution is observed that upon attainment of a reaction temperature of 50° C., the reaction mixture is so cooled that the temperature is held at 45 to 55° C. After completion of the addition of acetic anhydride, the reaction is allowed to run to completion with stirring but without further cooling. After 15 minutes, the mixture is cooled to about 30° C., and water (600 ml.) is then slowly added. The desired reaction product, namely 2,2-dimethyl-2,3-dihydro-benzo-1,3-oxazone-4 then crystallizes out slowly. It is isolated by filtration with strong suction, and is washed with the least possible amount of water until it shows a neutral reaction. Then the product is dried. The yield amounts to 150 to 158 G., corresponding to about 83 to 88% of the theoretical yield; melting point 136 to 138° C. The test for free phenolic hydroxyl groups shows a negative reaction.

EXAMPLE 2

The procedure of Example 1 is followed, using however 150 ml. of propionic anhydride instead of 110 ml. of acetic anhydride. The yield of 2,2-dimethyl-2,3-dihydro-benzo-1,3-oxazone-4 amounts to 148 grams, corresponding to 82% of the theoretical yield; melting point 136 to 138° C.

We claim:
1. A method of producing a 2,2-dialkyl-2,3-dihydrobenzo-1,3-oxazone-4 by reaction of salicylamide with an alkyl alkyl ketone, using excess ketone as solvent, wherein the improvement comprises carrying out the reaction by means of an alkanoic acid anhydride in the presence of a mineral acid at temperatures up to 70° C.

2. A method according to claim 1 wherein the alkanoic acid anhydride is selected from the class consisting of acetic anhydride, propionic anhydride and succinic anhydride.

3. A method according to claim 1 wherein the ketone is acetone.

4. A method according to claim 1 wherein the salicylamide concentration is from 5 to 30% of the weight of the entire reaction mixture.

5. A method according to claim 1 wherein the alkanoic acid anhydride and the salicylamide are used in substantially equimolecular proportions.

6. A method according to claim 1 wherein the reaction is carried out at a temperature of about 40 to 60° C.

References Cited
UNITED STATES PATENTS 3,257,396   6/1966   Koo _____ 260—244
2,776,281   1/1957   Wright _____ 260—244

HARRY I. MOATZ, Primary Examiner